United States Patent [19]

Kogure et al.

[11] Patent Number: 4,658,944
[45] Date of Patent: Apr. 21, 1987

[54] DISC CLUTCH MECHANISM FOR A MAGNETIC DISC APPARATUS OF CARTRIDGE TYPE

[75] Inventors: Toshiharu Kogure; Noriaki Masubuchi, both of Narashino, Japan

[73] Assignee: Seiko Seiki Kabushiki Kaisha, Chiba, Japan

[21] Appl. No.: 726,080

[22] Filed: Apr. 22, 1985

[30] Foreign Application Priority Data

Apr. 23, 1984 [JP] Japan ................................. 59-81527

[51] Int. Cl.⁴ .......................................... F16D 27/01
[52] U.S. Cl. ............................. 192/84 PM; 192/135; 360/97
[58] Field of Search ............... 192/84 PM, 135, 93 R; 360/97, 98, 99

[56] References Cited

U.S. PATENT DOCUMENTS 3,593,327 4/1971 Shill .................................. 360/97
4,310,864 1/1982 Patel et al. ....................... 360/97
4,521,819 6/1985 Elsing et al. ..................... 360/97
4,539,614 9/1985 Thompson ........................ 360/97
4,562,498 12/1985 Shibata ............................. 360/97

Primary Examiner—George H. Krizmanich
Attorney, Agent, or Firm—Robert E. Burns; Emmanuel J. Lobato; Bruce L. Adams

[57] ABSTRACT

A magnetic disc clutch mechanism comprises a housing for receiving a cartridge in which a magnetic disc is rotatably disposed. The housing has a base, an opening, and a door movable to close and open the opening. A spindle assembly is slidably mounted on the base under the cartridge, and the spindle assembly is movable upward to contact the magnetic disc for rotatably holding the magnetic disc and is movable downward for releasing the magnetic disc. A lever is disposed on the base, one end of the lever being connected to the door and the other end thereof being movable back and forth relative to the spindle assembly according to the opening and closing movements of the door. An arm extends from the spindle assembly and cooperatively engages with the other end of the lever so that the spindle assembly moves forward when the door is closed and the spindle assembly moves backward when the door is opened.

14 Claims, 7 Drawing Figures 4,658,944

DISC CLUTCH MECHANISM FOR A MAGNETIC DISC APPARATUS OF CARTRIDGE TYPE

BACKGROUND OF THE INVENTION

This invention relates to a magnetic disc clutch mechanism for a magnetic disc apparatus of cartridge type.

A magnetic disc cartridge is composed of, as shown in FIG. 1; a magnetic disc 2 which is rotatively mounted in a plastic cartridge case 1; a disc hub 3 for also serving as an armature which is projected from an opening 1a of a bottom surface of the cartridge case 1 so as to be adapted to fix the rotation center of the magnetic disc 2; a latching lever 5, the back end of which is energized toward the inner bottom surface of the case 1 by virtue of a leaf spring 4, and the top end of which is energized against a flange portion 3a formed around the periphery of the disc hub 3 so as to fix the disc hub 3 to the inner bottom surface of the cartridge case 1.

In a conventional magnetic disc apparatus of cartridge type to drive this magnetic disc cartridge, the magnetic disc 2 is sustained within the case 1 in a floating manner described as follows. After fixing a spindle assembly to an inner bottom surface of a housing which defines a cartridge chamber and after inserting the cartridge in the chamber, if it is executed to close a door of the chamber, an operation of a link system and the like which is cooperative with the door makes the cartridge descend and thereby the bottom surface of the disc hub 3 is connected to a magnetic chuck of the spindle assembly. In addition, a release pin which is mounted on the inner bottom surface of the housing, projects into the cartridge and abuts to a guide pin 5a which is fixed to the latching lever 5 and further pushes the latching lever 5 upwardly. Thus the magnetic disc 2 is sustained within the case 1 in the floating manner.

However, this constitution has a drawback such that it becomes large-sided, because it needs to ascend and/or descend a horizontally supporting device of the cartridge which is inserted into the cartridge chamber itself.

Moreover, the cartridge should be inserted within the cartridge chamber with a little rattle in order to make it easy to insert the cartridge into the chamber. On the contary, if a distance between the cartridge and the spindle assembly is not large enough, the cartridge interferes with the spindle assembly in its inserting operation so that more elevation amount is needed. This results in that the device is much thicker.

SUMMARY OF THE INVENTION

This invention is intended to simplify the loading mechanism of the disc cartridge and to constitute a device much thinner by ascending and/or descending the spindle assembly as opposed to the conventional magnetic disc apparatus mentioned above and by connecting the spindle assembly to the cartridge which is inserted within the cartridge chamber.

This invention, which is intended to attain these objects, is characterized in that a spindle assembly is vertically movable and is provided on a bottom surface of a housing in which a magnetic disc cartridge is adapted to be inserted, and that one end of a lever being slidable by virtue of open and/or close operations of a door which is arranged at a housing opening is cooperative with said spindle assembly so that the spindle assembly ascends to the cartridge in accordance with the door closing operation and descends from the cartridge in accordance with the door opening operation.

DESCRIPTION OF PREFERRED EMBODIMENTS

Figure 1:
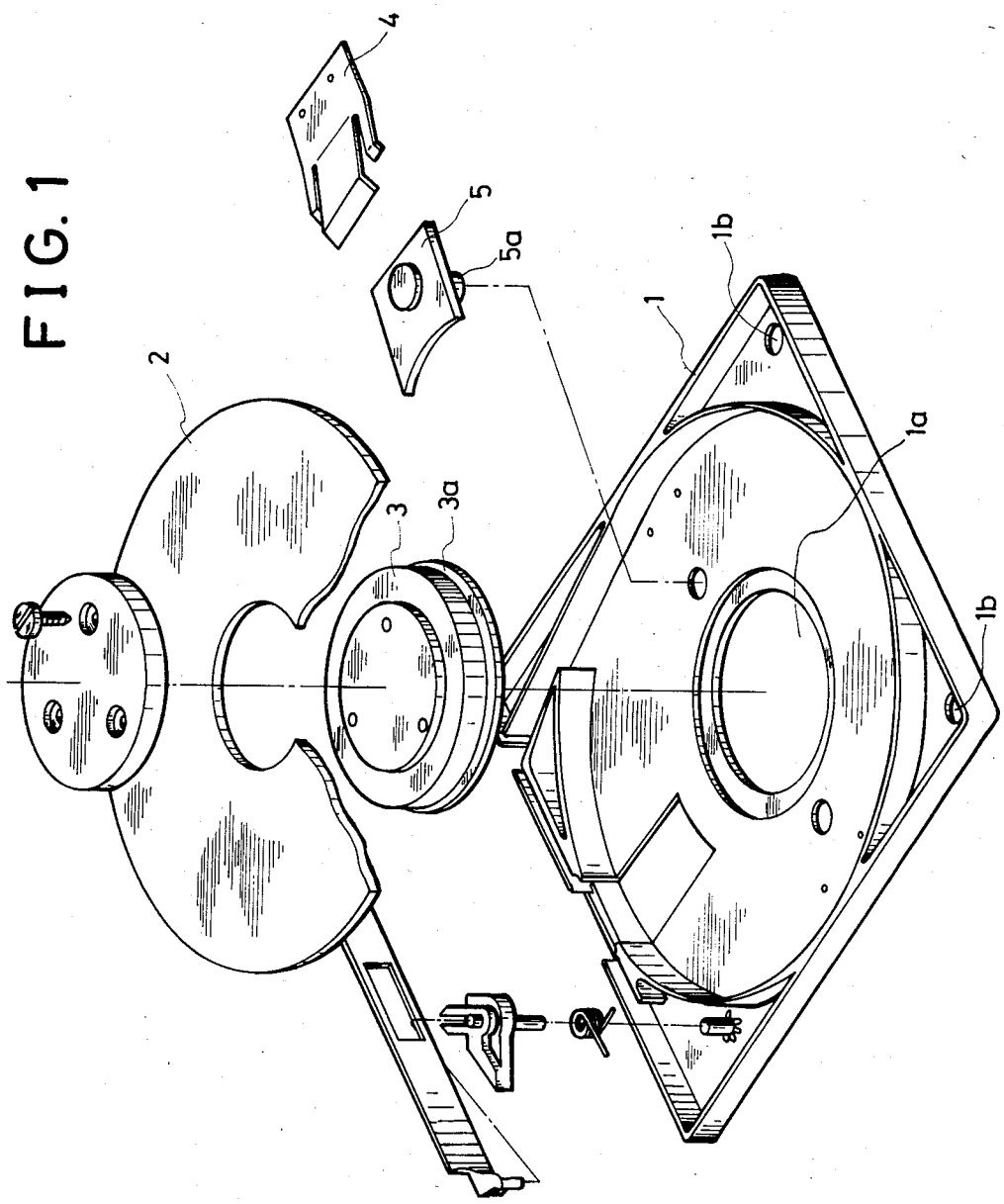
FIG. 1 is a perspective view of a magnetic disc cartridge in a disassembled state for illustrating a constitution of the magnetic disc cartridge.
Figure 2:
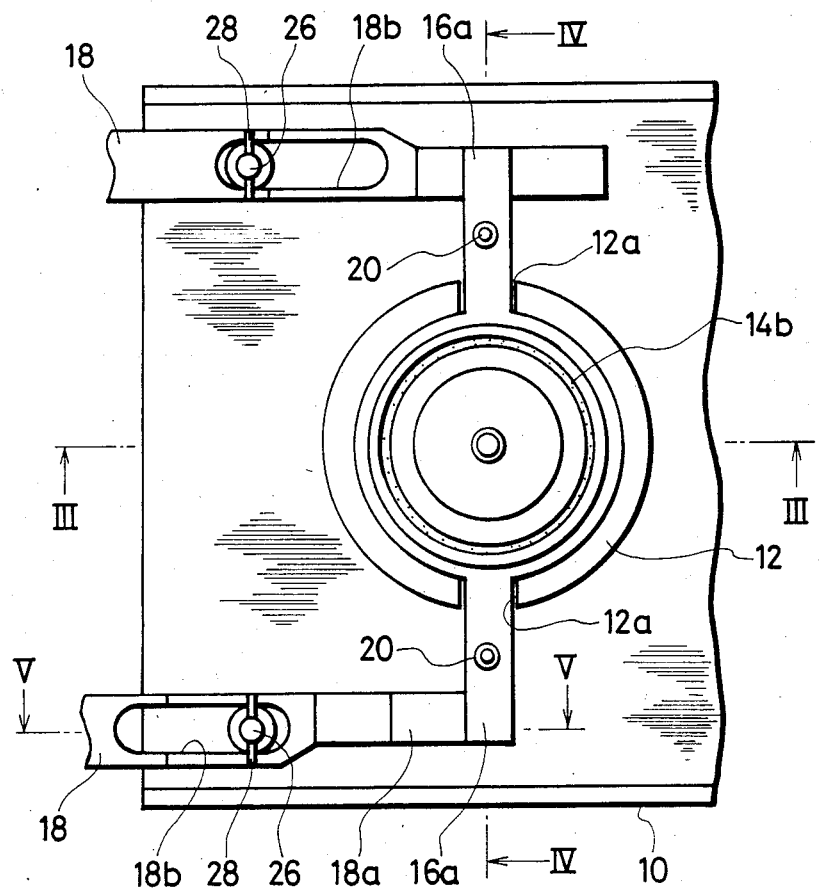
FIG. 2 is a plan view of a first embodiment of the present invention.
Figure 3:
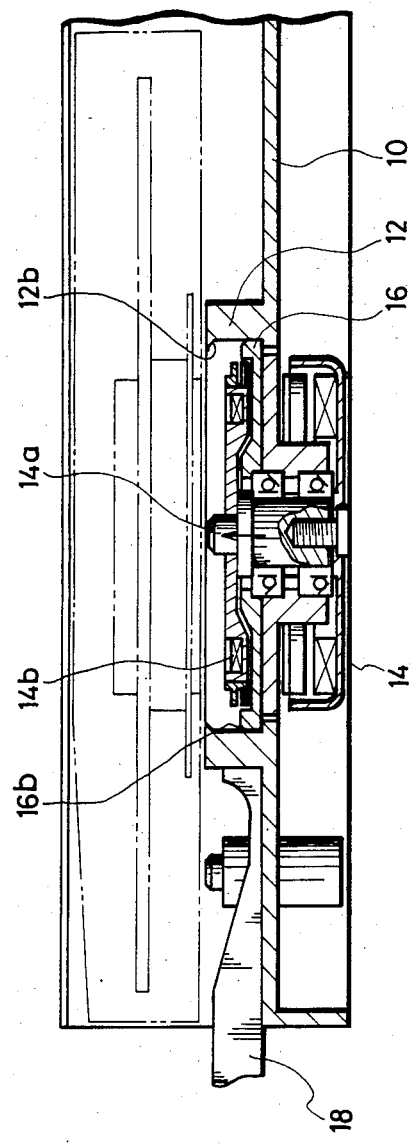
FIGS. 3 to 5 are cross-sectional views taken along III—III line, IV—IV line and V—V line of FIG. 2 respectively.
Figure 4:
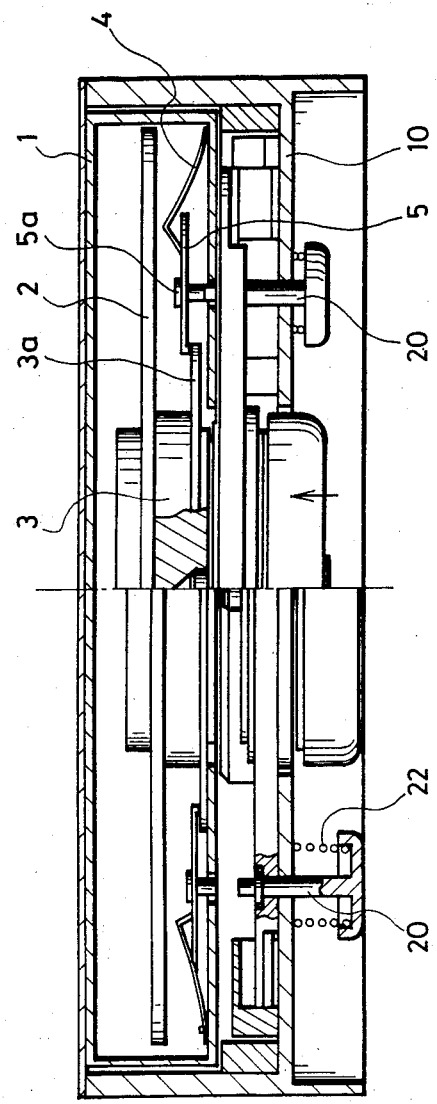
Figure 5:
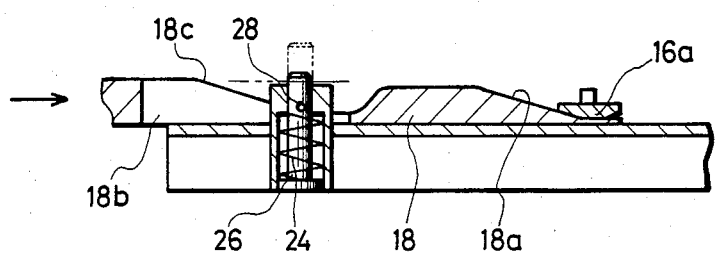

FIGS. 2 to 5 illustrate a first embodiment respectively. In each of the drawings, on the a center of an inner bottom surface or base of an end-opened housing 10, a cylindrical guide wall 12 is upstandingly provided and in an inner cylindrical portion of the cylindrical guide wall 12, a brushless direct current motor 14 of an outer-rotor type is provided.

A circumferential portion of the motor 14 is sustained by a guide block 16 which is slidably mounted within the inner cylindrical portion of the guide wall 12. At both of opposite sides of the guide block 16, a pair of arms 16a are integrally provided and extend protrusively through notches 12a which are formed on both of opposite sides of the guide wall 12.

On the other hand, on the inner bottom surface or base of the housing 10, a pair of levers 18 which are orthogonal to the arms 16a, are provided. Each of the levers 18 is slidably provided so as to be cooperative with open and/or close movements of a door or lid (not shown) which is secured to the opening of the housing 10 and each of the levers 18 is formed with a tapered shoe 18a at the slide surface where the arm 16a and the slide surface contact each other. Within the arm 16a, a release pin 20 which penetrates therethrough is disposed and on a circumference of a lower portion of the release pin 20, a compression coil-spring 22 is provided so as to normally bias the arm 16a in a downward direction.

Accordingly, in a state wherein the door or lid is opened, the motor 14 moves downward the under portion of the inner bottom surface of the housing 1 and thus the cartridge can be inserted into the housing. Further, if the cartridge is inserted and the door is closed, in accordance with the movement of the door, the lever 18 advances and pushes up the arm 16a along the taper surface of the shoe 18a.

Consequently, the motor 14 ascends together with the arm 16a so as to enable a positioning axis of the motor 14 do connect with the hub 3, and the motor 14 connects closely with the under surface of the hub 3 by virtue of a magnetic chuck 14b which is provided around the axis 14a. In accordance with this movement of the arm 16a, the release pin 20 ascends and pushes up the pin 5a sustaining the latching lever 5 so as to bring the latching lever 5 free from engagement with the hub 3. Thus, the magnetic disc 2 can be integrally rotative with the motor 14.

Moreover, on the upper edge of the inner peripheral portion of the guide wall 12, a taper portion 12b is provided and also, on the upper edge of outer peripheral portion of the guide block 16, a taper portion 16b is provided. Therefore, the elevated position of the motor 14 is stopped by the engagement of the taper portion 12b and the taper portion 16a. By virtue of this taper arrangement, the motor 14 can be fixed so that the center thereof is accurately aligned with the center of the guide wall 12.

In addition, on the intermediate portion of the arm 18, a long hole 18b is provided and on a part of the long hole 18b, as above described, a tapered shoe 18c is provided. On the bottom of the housing 10, there is provided with a positioning pin 26 which is normally located on the down position by virtue of the biasing force of a spring 24. On the upper portion of the positioning pin 26, there is provided a pin 28 which is engaged with the shoe 18c so as to push up the positioning pin 26 along the upper surface of said the shoe 18c.

The positioning pin 26 is correspondingly engaged with a positioning hole 1b which is penetratingly provided on the corner of the cartridge case 1, and can position the cartridge 1 within the housing when door is closed by engaging with the positioning hole 1b.

Figure 6A:
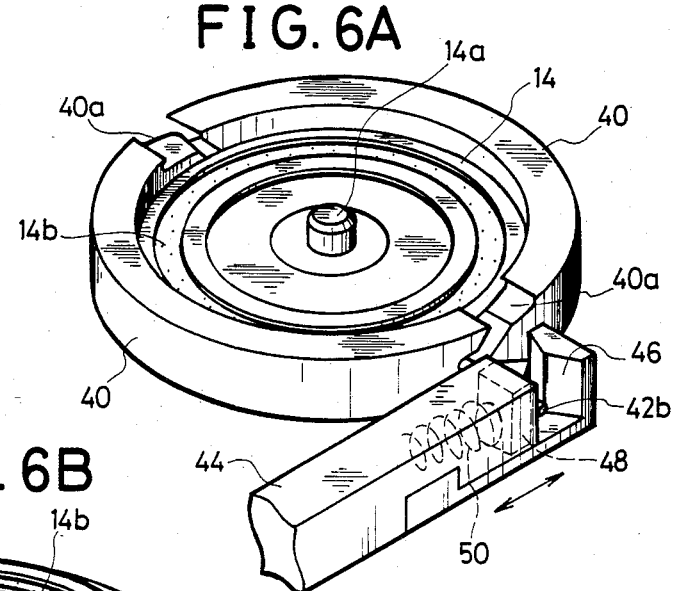
FIGS. 6A and 6B are perspective views of a second embodiment respectively.
Figure 6B:
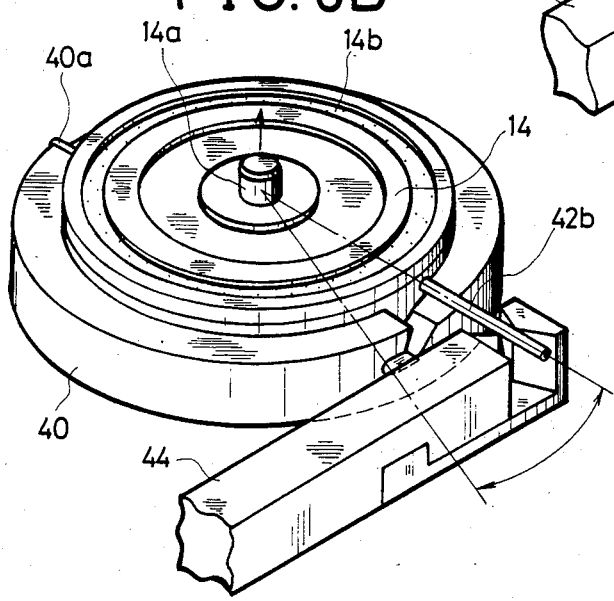

FIG. 6A and FIG. 6B illustrate a second embodiment. In the drawings, on both of the opposite sides of a guide sleeve 40, a pair of cam grooves 40a are provided at rotational symmetric positions. While, on the outer peripheral portion of the motor 14, pins 42a, 42b are protrusively provided so as to be adapted to engage with the cam grooves 40a respectively. Further, one of the pins 42b can engage with a top end of a lever 44 which is slidable in accordance with the open and/or close operation of the door (not shown).

The top end of the lever 44 is composed of a fixing member 46 for interposingly sustaining the pin 42b, a pushing member 48 for pushing the pin 42b, and a spring 50 which is mounted within the lever 44 and can normally forcibly urge the pushing member 48 against the fixing member 46.

FIG. 6A illustrates the state in which the door is opened. In this state, the pin 42b positions at the lowest position of the cam groove 40a. Thus, the motor 14 descends under the guide sleeve 40 and the positioning axis 14a is located lower than the upper portion of the guide sleeve. From this state, if the lever 44 advances, the motor 14 slides rotatively on the cam groove 40a by virtue of the lever of the pin 42 so that as shown in FIG. 6B, the motor is transferred upwardly.

Furthermore, in this embodiment, a release pin and a positioning pin are omitted respectively, but these parts can be installed as in the first embodiment. Also, in this embodiment, taper connecting means can be used as means for limiting the elevation position of the motor as in the first embodiment.

In addition, this invention is not limited to these embodiments and various modifications can be carried out within the range of the claims.

This invention is constituted as set forth above such that on comparison with the conventional apparatus wherein the cartridge side is moved up and down in accordance with the open and/or close operation of the door, the mechanism of the driving portion can be simplified and the device can be made thinner and more compact.

What is claimed is:

1. A magnetic disc clutch mechanism for loading a magnetic disc cartridge comprising: a housing for receiving a magnetic disc cartridge and having a bottom surface, means defining an opening provided opposite to the bottom surface, and a door movable to close and open the opening; a spindle assembly provided on the bottom surface and vertically movable upward and downward with respect to the magnetic disc cartridge; a movable lever disposed on the bottom surface, the lever having one end thereof connected to the door and the other end thereof movable in forward and backward directions with respect to the spindle assembly in response to closing and opening movements of the door respectively; and mechanical means integral with the spindle assembly and cooperatively engaged with the other end of the lever for converting the forward and backward movements of the other end of the lever into the upward and downward movements of the spindle assembly respectively, whereby the spindle assembly ascends to the magnetic disc cartridge in accordance with the door closing movement and descends from the magnetic disc cartridge in accordance with the door opening movement.

2. A magnetic disc clutch mechanism according to claim 1, wherein the mechanical means comprises an elastic member connected to the spindle mechanism for downwardly biasing the spindle mechanism against the bottom surface, and an engagement member integrally extending from the spindle assembly; and wherein the lever includes a taper portion provided at the other end of the lever for cooperatively engaging with the engagement member.

3. A magnetic disc clutch mechanism according to claim 1, wherein the mechanical means further comprises a sleeve in which said spindle assembly is rotatably inserted, a cam groove provided on said sleeve and a pin projected from the spindle assembly so as to penetrate into the cam groove so that the projected end of the pin engages with the other end of the lever.

4. An apparatus for loading and unloading a cartridge containing a rotatable disc, comprising: a housing having a base, means defining an opening opposite to the base, a movable lid disposed at the opening and movable to close and open the opening, and means for positioning a cartridge in the housing; a spindle assembly mounted on the base to undergo movement upward relative to the cartridge for rotatably holding a disc contained in the cartridge and movement downward relative to the cartridge for releasing the disc; lever means disposed on the base and having one end thereof connected to the lid and having the other end thereof movable in a forward direction relative to the spindle assembly in response to closing movement of the lid and movable in a backward direction relative to the spindle assembly in response to opening movement of the lid; and mechanical means connected to the spindle assembly and cooperatively engaged with the other end of the lever means for converting the forward movement of the other end of the lever means into upward movement of the spindle assembly and for converting the backward movement of the other end of the lever means into downward movement of the spindle assembly.

5. An apparatus according to claim 4; wherein the lever means comprises a pair of levers disposed in parallel with each other, each of the other ends of the levers having a tapering portion; and the mechanical means comprises a pair of arms integrally extending from the spindle assembly in opposite directions, the arms engaging with respective ones of the tapering portions.

6. An apparatus according to claim 5; wherein the mechanical means further comprises means including a release pin connected between at least one of the arms and the base for downwardly biasing the arm against the base.

7. An apparatus according to claim 6; wherein the release pin is mounted to move into the cartridge according to the upward movement of the spindle assembly so as to release the disc from the cartridge for rotation of the disc.

8. An apparatus according to claim 4; wherein the mechanical means comprises a sleeve provided on the base for rotatably mounting the spindle assembly therein, a pair of cam grooves in opposite sides of the sleeve, a pair of pins radially extending from the spindle assembly in opposite directions, the pins being slidably received in respective ones of the cam grooves, and at least one of the pins further radially extending from the spindle assembly so as to engage with the other end of the lever means.

9. An apparatus according to claim 8; wherein the lever means comprises a single lever having means at the other end thereof for sustaining the at least one pin.

10. An apparatus according to claim 9; wherein the means for sustaining the pin comprises a fixing member, and a pushing member for biasing the pin against the fixing member.

11. An apparatus according to claim 4; including means disposed between the lever means and the base for downwardly biasing the lever means against the base.

12. An apparatus according to claim 11; wherein the means for downwardly biasing comprises a positioning pin movable into the cartridge according to the upward movement of the spindle assembly so as to guide the cartridge into position.

13. An apparatus according to claim 4; wherein the base has a guide wall for positioning the spindle assembly.

14. An apparatus according to claim 13; wherein the guide wall comprises a tapering portion provided at an inner edge of the guide wall for stopping the upward movement of the spindle assembly.

* * * * *